J. T. BRUEN.
Friction-Slide for Drop-Lights.

No. 164,802.          Patented June 22, 1875.

UNITED STATES PATENT OFFICE.

JOHN T. BRUEN, OF BROOKLYN, NEW YORK.

IMPROVEMENT IN FRICTION-SLIDES FOR DROP-LIGHTS.

Specification forming part of Letters Patent No. 164,802, dated June 22, 1875; application filed March 17, 1875.

*To all whom it may concern:*

Be it known that I, JOHN T. BRUEN, of Brooklyn, in the county of Kings and State of New York, have invented an Improved Friction-Slide for Drop-Lights of Gasaliers, and for other purposes; and I do hereby declare that the following is a full, clear, and exact description of the same, reference being had to the accompanying drawing, forming part of this specification.

My invention relates to a friction-slide, which is intended more particularly for application to the distributer or distributing-pipe of a gasalier, for the purpose of holding the drop-light in desired positions.

The invention consists in a novel construction and combination of a series of vibrating-levers and clamping-jaws, and means for holding and adjusting the same, whereby the pipe or spindle of a drop-light or other article may be placed and held in different positions.

Figure 1:
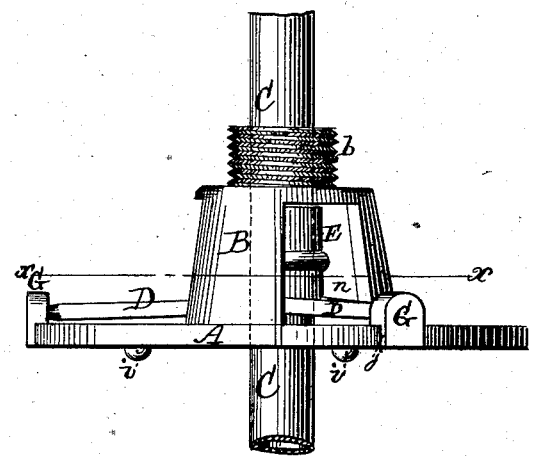
Figure 3:
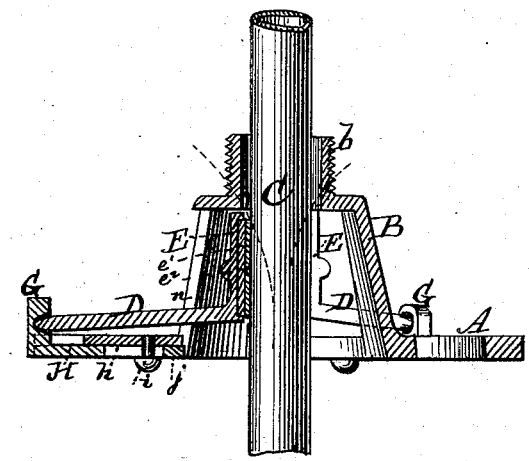
Figure 2:
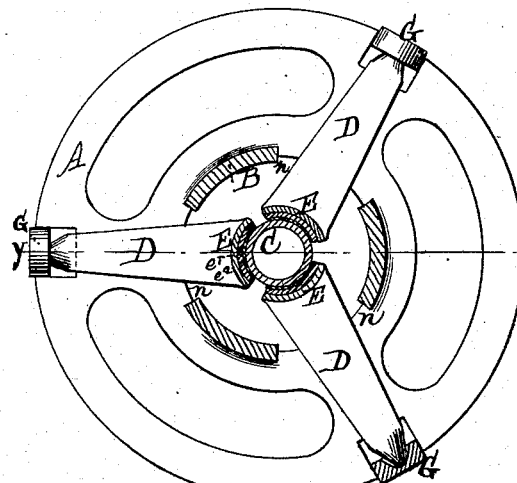
Figure 4:
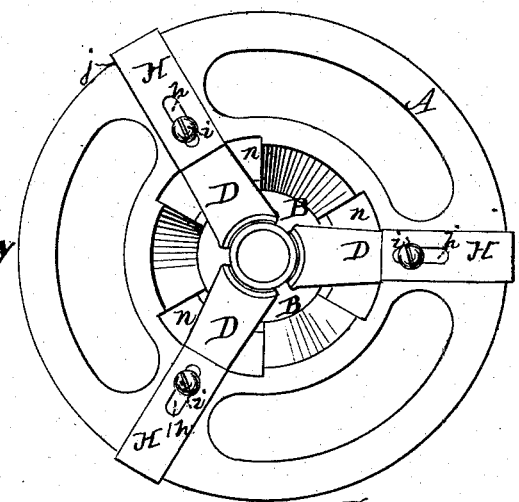

In the accompanying drawing, Figure 1 is a side view of my improved friction-slide. Fig. 2 is a horizontal section, taken in the line $x$ $x$ of Fig. 1. Fig. 3 is a vertical section, taken in the line $y$ $y$ of Fig. 2. Fig. 4 is a view of the under side.

A represents a frame of circular or other suitable form, from the center of which rises a cap B, which is provided with a screw-thread, $b$, for attaching it to the distributer or lower end of the distributing-pipe. In the top of the cap B is an opening for the passage of the pipe C, to the lower end of which the drop-light is attached, which pipe is held in place by a series of levers, D, having clamping-jaws E formed on their inner ends and extending through openings $n$ in the cap B. The jaws E are represented as arranged, at an angle slightly obtuse to the levers D, so that when the jaws E are in a strictly vertical position, parallel with each other, the levers D are slightly inclined, with their inner ends higher than their outer ends, as shown in Figs. 1 and 2, and when the levers are in a horizontal position the jaws E are inclined inward, with their upper ends nearer to each other than their lower ends. The inner sides or faces of the jaws are concave, corresponding with the cylindrical form of the pipe C, and these concave surfaces are faced with rubber $e^1$, and chamois skin $e^2$, or with felt or other soft or elastic material. There may be any desired number of the levers and jaws; but I prefer to use three, as shown herein. The outer ends of the levers D are coned or rounded to form what are known as male centers, which have their bearings in corresponding female centers formed in lugs G, attached to the outer portion of the frame. The levers might be hinged if desired, but the manner of pivoting them in male and female center-bearings, as shown herein, is preferable, as it allows the jaws to adjust themselves laterally to the slide or drop pipe C. The lugs G may be rigidly attached to the frame A; but I prefer to form them, as shown herein, on the outer ends of sliding-blocks H, each of which works in a groove, $j$, formed in the frame A, and is held in place by a set-screw, $i$, passing through a slot, $h$, in the block H, and entering a tap-hole in the frame A. By this construction and arrangement the blocks H may be adjusted nearer to or further from the center of the frame, and thus the jaws may be made to clamp the pipe C with the exact degree of pressure required. The top of the cap B forms a stop, which limits the upward movement of the jaws and prevents them from rising higher than necessary. The frame is attached to the lower end of the distributing-pipe, so that the drop-light pipe C will slide telescopically in the distributing-pipe, a stuffing-box or other suitable packing, such as commonly employed, being applied to prevent leakage of gas. When the gasalier is provided with a distributer, the frame may be attached either inside or outside of the same. When the drop-light is to be elevated, as the pipe C is pushed upward, its friction on the jaws E causes the levers D to vibrate upward so as to bring the jaws E to a position further apart, and allow said pipe to readily slide between them. When the drop light is to be lowered, as the pipe C is pulled downward, its friction on the jaws causes the levers D to vibrate downward, so as to bring the upper ends of the jaws E toward each other and clamp the pipe between them and thus hold it in any position in which it may be when released.

What I claim as new, and desire to secure by Letters Patent, is—

1. The combination, with the frame A, of the vibrating-levers D, having the clamping-jaws E formed on their inner ends for clamping the pipe or spindle C, and having their outer ends formed with male centers engaging with female centers in the lugs G on the frame, as herein shown and described.

2. The combination, with the frame A and levers D, of the adjustable sliding blocks H, for regulating the pressure of the clamping-jaws, substantially as described.

JNO. T. BRUEN.

Witnesses:
   HENRY T. BROWN,
   MICHAEL RYAN.